United States Patent
Granger-Jones et al.

(10) Patent No.: US 10,003,375 B2
(45) Date of Patent: Jun. 19, 2018

(54) RADIO FREQUENCY CIRCUITRY FOR CARRIER AGGREGATION

(71) Applicant: Qorvo US, Inc., Greensboro, NC (US)

(72) Inventors: Marcus Granger-Jones, Scotts Valley, CA (US); Nadim Khlat, Cugnaux (FR)

(73) Assignee: Qorvo US, Inc., Greensboro, NC (US)

( * ) Notice: Subject to any disclaimer, the term of this patent is extended or adjusted under 35 U.S.C. 154(b) by 0 days. days.

(21) Appl. No.: 15/404,584

(22) Filed: Jan. 12, 2017

(65) Prior Publication Data

US 2017/0201290 A1     Jul. 13, 2017

Related U.S. Application Data

(60) Provisional application No. 62/278,006, filed on Jan. 13, 2016.

(51) Int. Cl.
H04B 1/44     (2006.01)

(52) U.S. Cl.
CPC ................... H04B 1/44 (2013.01)

(58) Field of Classification Search
CPC .......... H04B 1/40; H04B 1/006; H04B 1/525; H04B 1/0483; H04B 2001/0416; H04B 2001/045; H04B 3/36; H04B 3/52; H04B 3/56; H04B 7/15557
USPC .......................................................... 455/78
See application file for complete search history.

(56) References Cited

U.S. PATENT DOCUMENTS

| | | | |
|---|---|---|---|
| 7,756,486 B1* | 7/2010 | Tan ................... | H04B 1/525 323/222 |
| 2015/0091653 A1* | 4/2015 | Kobayashi ............ | H03F 1/0288 330/295 |
| 2016/0079650 A1* | 3/2016 | Solomko ................... | H01P 5/18 333/103 |

* cited by examiner

*Primary Examiner* — Ajibola Akinyemi
(74) *Attorney, Agent, or Firm* — Withrow & Terranova, P.L.L.C.

(57) ABSTRACT

RF circuitry includes a filter, a termination impedance, and band switching circuitry. The filter is coupled between a first input/output node and a common node and configured to pass RF signals within a transmit portion of a first operating band from the first input/output node to the common node while attenuating signals outside of the transmit portion of the first operating band. The termination impedance is coupled between a termination impedance node and ground. The band switching circuitry is configured to couple the termination impedance node to the first input/output node such that the termination impedance is coupled between the first input/output node and ground in a first mode of operation. In a second mode of operation, the band switching circuitry is configured to provide RF transmit signals within the transmit portion of the first operating band to the first input/output node.

18 Claims, 4 Drawing Sheets

RADIO FREQUENCY CIRCUITRY FOR CARRIER AGGREGATION

RELATED APPLICATIONS

This application claims the benefit of provisional patent application Ser. No. 62/278,006, filed Jan. 13, 2016, the disclosure of which is hereby incorporated herein by reference in its entirety.

FIELD OF THE DISCLOSURE

The present disclosure relates to radio frequency (RF) circuitry, and specifically to RF circuitry capable of operating in one or more carrier aggregation configurations.

BACKGROUND

Carrier aggregation, in which a wireless communications device simultaneously transmits and/or receives radio frequency (RF) signals over multiple frequency bands, has become increasingly popular in order to maximize data throughput. Supporting carrier aggregation in a wireless communications device presents several challenges in the design and manufacture of the device. FIG. 1 is a functional schematic of conventional radio frequency (RF) front end circuitry 10 suitable for performing both uplink carrier aggregation in which multiple RF transmit signals in different operating bands are simultaneously transmitted and downlink carrier aggregation in which multiple RF receive signals in different operating bands are simultaneously received. The conventional RF front end circuitry 10 includes primary communications circuitry 12, secondary communications circuitry 14, and control circuitry 16. The primary communications circuitry 12 is coupled to a primary antenna 18. The secondary communications circuitry 14 is coupled to a secondary antenna 20. The control circuitry 16 is coupled to both the primary communications circuitry 12 and the secondary communications circuitry 14.

The primary communications circuitry 12 includes primary front end switching circuitry 22, primary RF filtering circuitry 24, and a number of RF power amplifiers 26. The primary front end switching circuitry 22 is coupled between the primary RF filtering circuitry 24 and a primary antenna node 28, which is in turn coupled to the primary antenna 18. The primary RF filtering circuitry 24 includes a primary filter 30 coupled between a common node 32 and a number of input/output nodes 34. An output of a first one of the RF power amplifiers 26A is coupled to a third one of the input/output nodes 34C. An output of a second one of the RF power amplifiers 26B is coupled to a first one of the input/output nodes 34A. The primary front end switching circuitry 22 includes a first primary front end switching element SW_PFE1 coupled between the primary antenna node 28 and the common node 32 and a second primary front end switching element SW_PFE2 coupled between the primary antenna node 28 and an additional filter node 36, which is configured to be coupled to an additional filter (not shown to simplify the drawings and present description). While not shown, additional switch throws to route to additional filters may be included in the primary front end switching circuitry 22 for supporting transmission and reception in additional RF bands.

The primary filter 30 is configured to pass RF signals within a transmit portion of a first operating band between the first one of the input/output nodes 34A and the common node 32 while attenuating signals outside of the transmit portion of the first operating band between the first one of the input/output nodes 34A and the common node 32, pass RF signals within a receive portion of the first operating band between the common node 32 and a second one of input/output nodes 34B while attenuating signals outside the receive portion of the first operating band between the common node 32 and the second one of the input/output nodes 34B, pass RF signals within a transmit portion of a second operating band between the third one of the input/output nodes 34C and the common node 32 while attenuating signals outside of the receive portion of the second operating band between the third one of the input/output nodes 34C and the common node 32, and pass RF signals within a receive portion of the second operating band between the common node 32 and a fourth one of the input/output nodes 34D while attenuating signals outside the receive portion of the second operating band between the common node 32 and the fourth one of the input/output nodes 34D. Those skilled in the art will appreciate that the primary RF filtering circuitry 24 enables the conventional RF front end circuitry 10 to simultaneously transmit and receive RF signals within the first operating band and the second operating band.

The first one of the RF power amplifiers 26A is configured to receive and amplify RF transmit signals within the transmit portion of the first operating band. The second one of the RF power amplifiers 26B is configured to receive and amplify RF transmit signals within the transmit portion of the second operating band.

The primary front end switching circuitry 22 is configured to couple a number of filters in the primary RF filtering circuitry 24 to the primary antenna node 28 in order to selectively route RF signals to the appropriate signal paths in the conventional RF front end circuitry 10.

While not shown, a number of low-noise amplifiers (LNAs) may connect to the second one of the input/output nodes 34B and the fourth one of the input/output nodes 34D in order to amplify the receive signals therefrom for further processing.

The secondary communications circuitry 14 includes secondary front end switching circuitry 38 and secondary RF filtering circuitry 40. The secondary front end switching circuitry 38 is coupled between the secondary RF filtering circuitry 40 and a secondary antenna node 42, which is in turn coupled to the secondary antenna 20. The secondary RF filtering circuitry 40 includes a secondary filter 44 coupled between a common node 46 and a number of input/output nodes 48. The secondary front end switching circuitry 38 includes a first secondary front end switching element SW_SFE1 coupled between the secondary antenna node 42 and the common node 46 and a second secondary front end switching element SW_SFE2 coupled between the secondary antenna node 42 and an additional filter node 50, which is configured to be coupled to an additional filter (not shown to simplify the drawings and present description). While not shown, additional switch throws to route to additional filters may be included in the secondary front end switching circuitry 38 for supporting reception in additional RF bands.

The secondary filter 44 is configured to pass RF signals within the receive portion of the first operating band between the common node 46 and a first one of the input/output nodes 48A while attenuating signals outside the receive portion of the first operating band between the common node 46 and the first one of the input/output nodes 48A and pass RF signals within the receive portion of the second operating band between the common node 46 and a second one of the input/output nodes 48B while attenuating signals outside the receive portion of the second operating band between the common node 46 and the second one of the input/output nodes 48B.

The secondary front end switching circuitry 38 is configured to couple a number of filters in the secondary RF filtering circuitry 40 to the secondary antenna node 42 in order to selectively route RF signals to the appropriate signal paths in the conventional RF front end circuitry 10.

While not shown, a number of LNAs may connect to the first one of the input/output nodes 48A and the second one of the input/output nodes 48B in order to amplify the receive signals therefrom for further processing.

Generally, the primary communications circuitry 12 is responsible for transmitting and receiving primary RF signals, while the secondary communications circuitry 14 is responsible for receiving secondary RF signals. As discussed herein, primary RF signals are the main transmit and receive signals used for communication, while secondary RF signals are additional signals used to improve reception quality or data throughput. For example, the secondary RF signals may be diversity receive signals or multiple-input-multiple-output (MIMO) receive signals. Further, what is referred to herein as an operating band is an RF frequency band, which may include a transmit portion (a sub-band of the RF frequency band) which is dedicated to transmitting signals and a receive portion (a sub-band of the RF frequency band) which is dedicated to receiving signals. Those skilled in the art will appreciate that some operating bands are receive-only operating bands in which the entirety of the operating band is dedicated to receiving signals. Examples of operating bands are the Long Term Evolution (LTE) operating bands.

While the conventional RF front end circuitry 10 is capable of both uplink and downlink carrier aggregation, the circuitry may suffer from signal degradation due to intermodulation distortion in certain carrier aggregation configurations. Such a problem may occur, for example, when the first operating band is LTE operating band 3 and the second operating band is LTE operating band 1. When the control circuitry 16 causes the conventional RF front end circuitry 10 to simultaneously provide RF signals within the transmit portion of the first operating band and RF signals within the transmit portion of the second operating band from the first one of the RF power amplifiers 26A and the second one of the RF power amplifiers 26B, respectively, these signals may intermodulate with one another to produce troublesome intermodulation products. Due to the combination of operating bands discussed above, intermodulation products may fall directly into the receive portion of the first operating band. The intermodulation discussed above may necessitate highly linear switching and filtering components in the conventional RF front end circuitry 10, which may be impractical when considering the design constraints thereof.

For the reasons described above, there is a need for improved RF front end circuitry capable of operating in carrier aggregation modes without excessive intermodulation.

SUMMARY

The present disclosure relates to radio frequency (RF) circuitry, and specifically to RF circuitry capable of operating in one or more carrier aggregation configurations. In one embodiment, RF circuitry includes a filter, a termination impedance, and band switching circuitry. The filter is coupled between a first input/output node and a common node and configured to pass RF signals within a transmit portion of a first operating band from the first input/output node to the common node while attenuating signals outside of the transmit portion of the first operating band between the first input/output node and the common node. The termination impedance is coupled between a termination impedance node and ground. The band switching circuitry is coupled to the first input/output node and configured to couple the termination impedance node to the first input/output node such that the termination impedance is coupled between the first input/output node and ground in a first mode of operation. In a second mode of operation, the band switching circuitry is configured to provide RF transmit signals within the transmit portion of the first operating band to the first input/output node. Coupling the termination impedance to the first input/output node in the first mode of operation changes the impedance presented at the common node. Since the common node will be connected to an upstream antenna, this in turn changes the impedance presented to the antenna and allows for increased antenna-to-antenna isolation in order to reduce undesirable signal leakage and thus intermodulation distortion.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
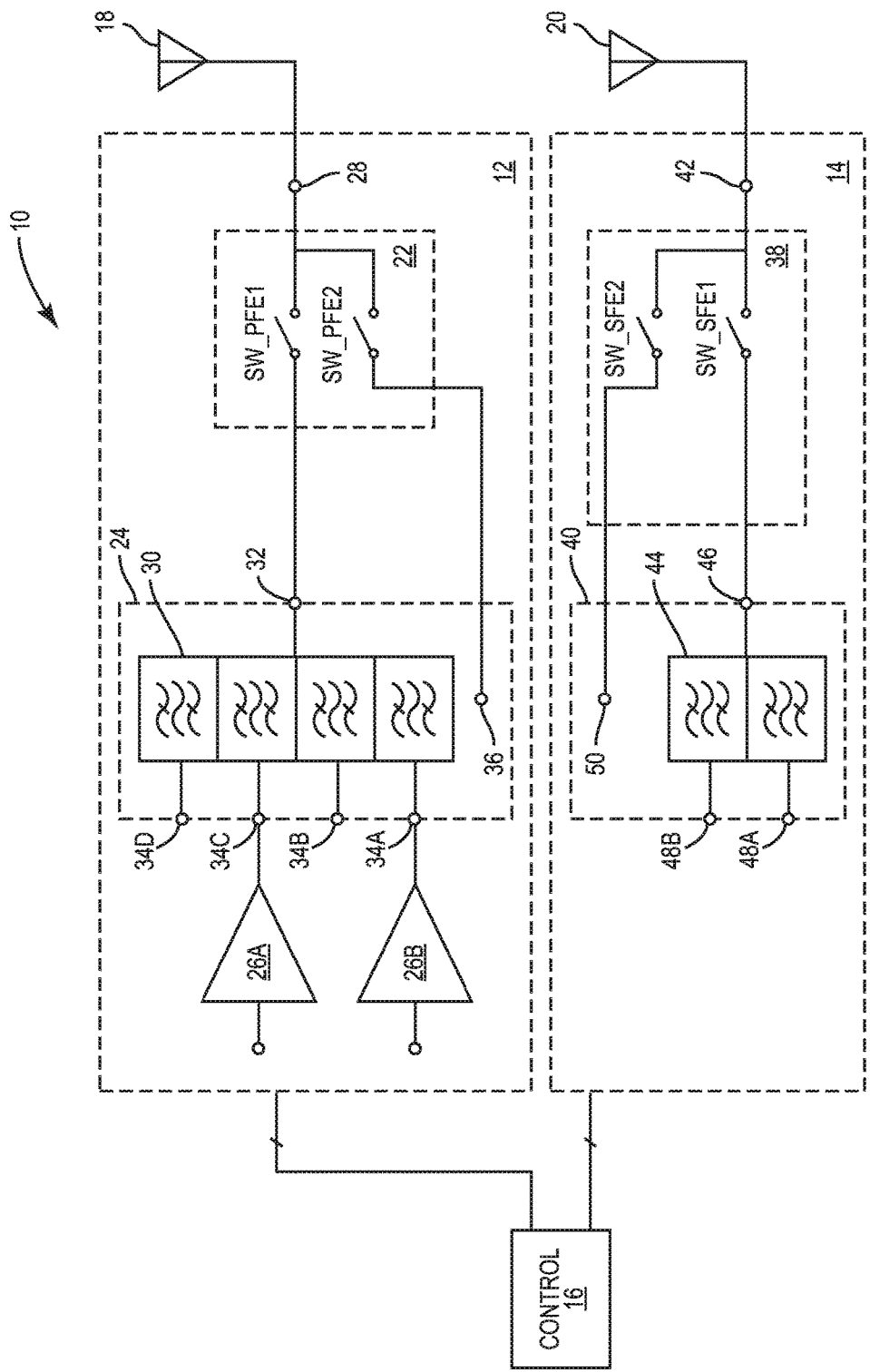
FIG. 1 is a functional schematic of conventional radio frequency (RF) front end circuitry.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 2:
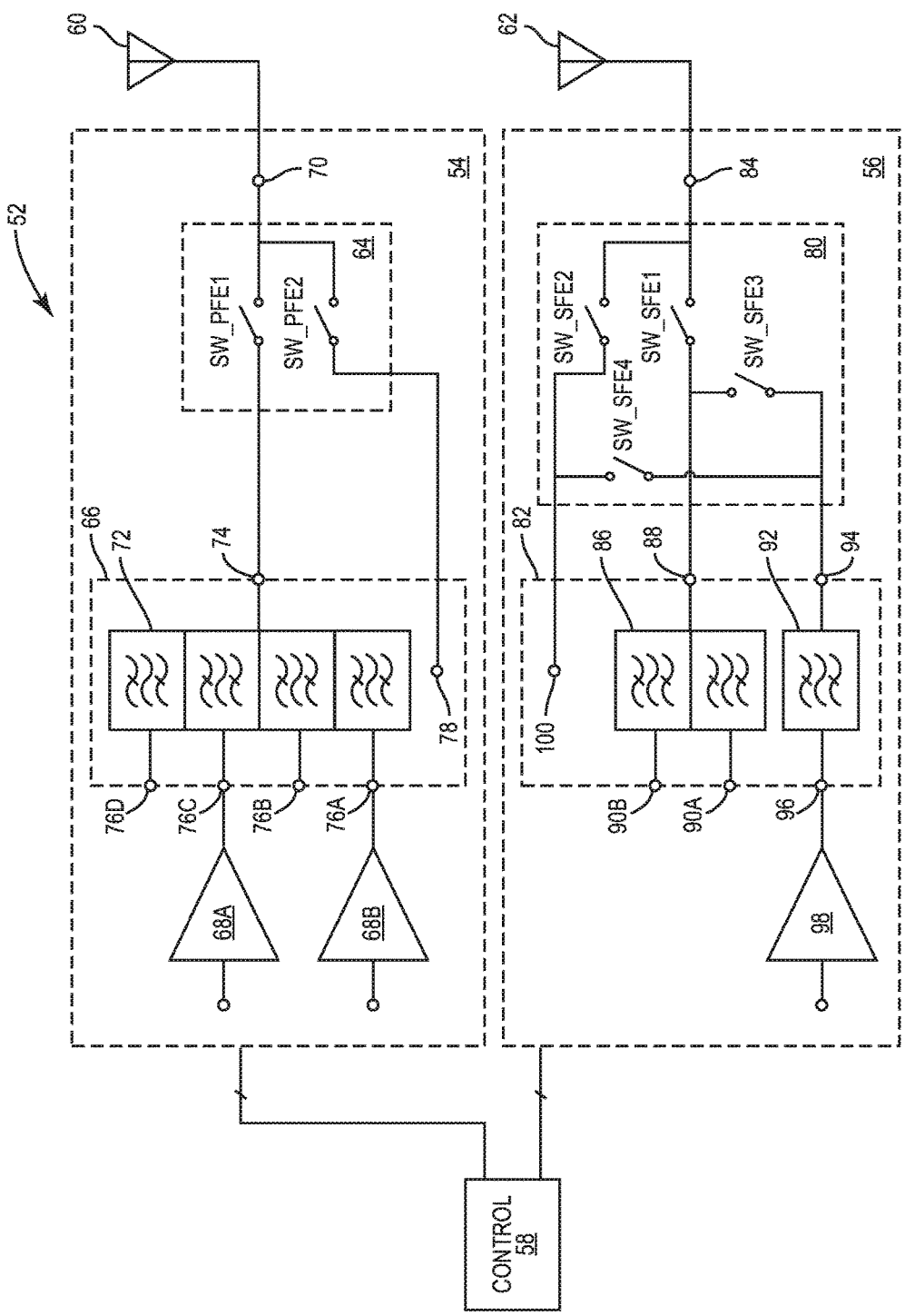
FIG. 2 is a functional schematic of RF front end circuitry according to one embodiment of the present disclosure.

One way to reduce intermodulation during uplink carrier aggregation configurations is by separately transmitting radio frequency (RF) signals in different operating bands from different antennas, as described in co-assigned and co-pending U.S. patent application Ser. No. 15/289,476, now U.S. Pat. No. 9,853,683, the contents of which are hereby incorporated by reference in their entirety. FIG. 2 is a functional schematic illustrating RF front end circuitry 52 incorporating these principles for reduced intermodulation according to one embodiment of the present disclosure. The RF front end circuitry 52 includes primary communications circuitry 54, secondary communications circuitry 56, and control circuitry 58. The primary communications circuitry 54 is coupled to a primary antenna 60. The secondary communications circuitry 56 is coupled to a secondary antenna 62. The control circuitry 58 is coupled to both the primary communications circuitry 54 and the secondary communications circuitry 56. While not shown, antenna swapping circuitry may be located in both the primary communications circuitry 54 and the secondary communications circuitry 56 and couple the primary communications circuitry 54 and the secondary communications circuitry 56 via a number of antenna coupling lines in order to enable swapping of the primary antenna 60 and the secondary antenna 62. Said antenna swapping circuitry is omitted to avoid obscuring the drawings, however, the details of the antenna swapping circuitry will be appreciated by those skilled in the art.

The primary communications circuitry 54 includes primary front end switching circuitry 64, primary RF filtering circuitry 66, and a number of primary RF power amplifiers 68. The primary front end switching circuitry 64 is coupled between the primary RF filtering circuitry 66 and a primary antenna node 70, which is in turn coupled to the primary antenna 60. The primary RF filtering circuitry 66 includes a primary filter 72 coupled between a common node 74 and a number of input/output nodes 76. An output of a first one of the primary RF power amplifiers 68A is coupled to a third one of the input/output nodes 76C. An output of a second one of the primary RF power amplifiers 68B is coupled to a first one of the input/output nodes 76A. The primary front end switching circuitry 64 includes a first primary front end switching element SW_PFE1 coupled between the primary antenna node 70 and the common node 74 and a second primary front end switching element SW_PFE2 coupled between the primary antenna node 70 and an additional filter node 78, which may be coupled to an additional filter (not shown to simplify the drawings and the present description). Those skilled in the art will appreciate that any number of filters may be included in the primary RF filtering circuitry 66 and coupled to the primary antenna node 70 via any number of primary front end switching elements in the primary front end switching circuitry 64 without departing from the principles of the present disclosure. Further, those skilled in the art will appreciate that the primary filter 72 may be configured to separately pass any number of RF signals within additional operating bands without departing from the present disclosure. That is, the primary filter 72 may be any order n-plexer.

The primary filter 72 is configured to pass RF signals within a transmit portion of a first operating band between the first one of the input/output nodes 76A and the common node 74 while attenuating signals outside of the transmit portion of the first operating band between the first one of the input/output nodes 76A and the common node 74, pass RF signals within a receive portion of the first operating band between the common node 74 and a second one of the input/output nodes 76B while attenuating signals outside of the receive portion of the second operating band between the common node 74 and the second one of the input/output nodes 76B, pass RF signals within a transmit portion of a second operating band between the third one of the input/output nodes 76C and the common node 74 while attenuating signals outside the transmit portion of the second operating band between the third one of the input/output nodes 76C and the common node 74, and pass RF signals within a receive portion of the second operating band between the common node 74 and a fourth one of the input/output nodes 76D while attenuating signals outside the receive portion of the second operating band between the common node 74 and the fourth one of the input/output nodes 76D. Those skilled in the art will appreciate that the primary RF filtering circuitry 66 enables the RF front end circuitry 52 to simultaneously transmit and receive RF signals within the first operating band and the second operating band.

The first one of the primary RF power amplifiers 68A is configured to receive and amplify RF transmit signals within the transmit portion of the first operating band. The second one of the primary RF power amplifiers 68B is configured to receive and amplify RF transmit signals within the transmit portion of the second operating band.

The primary front end switching circuitry 64 is configured to couple a number of filters in the primary RF filtering circuitry 66 to the primary antenna node 70 in order to selectively route RF signals to the appropriate signal paths in the RF front end circuitry 52.

While not shown, a number of low-noise amplifiers may connect to the second one of the input/output nodes 76B, the fourth one of the input/output nodes 76D, and any other input/output nodes not shown in order to amplify the receive signals therefrom for further processing.

The secondary communications circuitry 56 includes secondary front end switching circuitry 80 and secondary RF filtering circuitry 82. The secondary front end switching circuitry 80 is coupled between the secondary RF filtering circuitry 82 and a secondary antenna node 84, which is in turn coupled to the secondary antenna 62. The secondary RF filtering circuitry 82 includes a secondary filter 86 coupled between a common node 88 and a number of input/output nodes 90 and a transmit signal filter 92 coupled between a reconfigurable output node 94 and a transmit signal input node 96. An output of a secondary RF power amplifier 98 is coupled to the transmit signal input node 96. The secondary front end switching circuitry 80 includes a first secondary front end switching element SW_SFE1 coupled between the secondary antenna node 84 and the common node 88, a second secondary front end switching element SW_SFE2 coupled between the secondary antenna node 84 and an additional filter node 100, a third secondary front end switching element SW_SFE3 coupled between the reconfigurable output node 94 and the common node 88, and a fourth secondary front end switching element SW_SFE4 coupled between the reconfigurable output node 94 and the additional filter node 100. The additional filter node 100 may be coupled to an additional filter (not shown to simplify the drawings and present description). Those skilled in the art will appreciate that any number of filters may be included in the secondary RF filtering circuitry 82 and coupled to the secondary antenna node 84 via any number of secondary front end switching elements in the secondary front end switching circuitry 80 without departing from the principles of the present disclosure.

The secondary filter 86 is configured to pass RF signals within the receive portion of the first operating band between the common node 88 and a first one of the input/output nodes 90A while attenuating signals outside the receive portion of the first operating band between the common node 88 and the first one of the input/output nodes 90A and pass RF signals within the receive portion of the second operating band between the common node 88 and a second one of the input/output nodes 90B while attenuating signals outside the receive portion of the second operating band between the common node 88 and the second one of the input/output nodes 90B. The transmit signal filter 92 is configured to pass RF signals within the transmit portion of the first operating band between the transmit signal input node 96 and the reconfigurable output node 94 while attenuating signals outside the transmit portion of the second operating band between the transmit signal input node 96 and the reconfigurable output node 94.

The secondary RF power amplifier 98 is configured to receive and amplify RF signals within the transmit portion of the first operating band.

The secondary front end switching circuitry 80 is configured to couple a number of filters in the secondary RF filtering circuitry 82 to the secondary antenna node 84 in order to selectively route RF signals to the appropriate signal paths in the RF front end circuitry 52.

While not shown, a number of LNAs may connect to the first one of the input/output nodes 90A, the second one of the input/output nodes 90B, and any other input output nodes in order to amplify receive signals therefrom for further processing.

As discussed above, the primary communications circuitry 54 is generally responsible for transmitting and receiving primary RF signals, while the secondary communications circuitry 56 is responsible for receiving secondary RF signals. In order to reduce intermodulation in certain uplink carrier aggregation configurations as discussed above, the control circuitry 58 is configured to cause RF signals within the transmit portion of the first operating band to be transmitted from the secondary communications circuitry 56 and cause RF signals within the transmit portion of the second operating band to be transmitted from the primary communications circuitry 54 in one or more uplink carrier aggregation configurations. This may involve coupling the transmit signal filter 92 to the secondary antenna node 84, turning on the secondary RF power amplifier 98, and providing RF signals within the transmit portion of the first operating band thereto while providing RF signals within the transmit portion of the second operating band to the second one of the primary RF power amplifiers 68B. By transmitting the RF signals within the transmit portion of the first operating band from the secondary antenna 62 and transmitting the RF signals within the transmit portion of the second operating band from the primary antenna 60, antenna-to-antenna isolation is provided between the RF signals. This significantly reduces cross-contamination of the signals in their respective signal paths and accordingly reduces intermodulation.

In non-uplink carrier aggregation configurations, the control circuitry 58 is configured to cause RF signals within the transmit portion of the first operating band to be transmitted from the primary communications circuitry 54. This allows the RF signals within the transmit portion of the first operating band to be transmitted from the primary antenna 60, which generally provides superior performance as will be appreciated by those skilled in the art.

Figure 3:
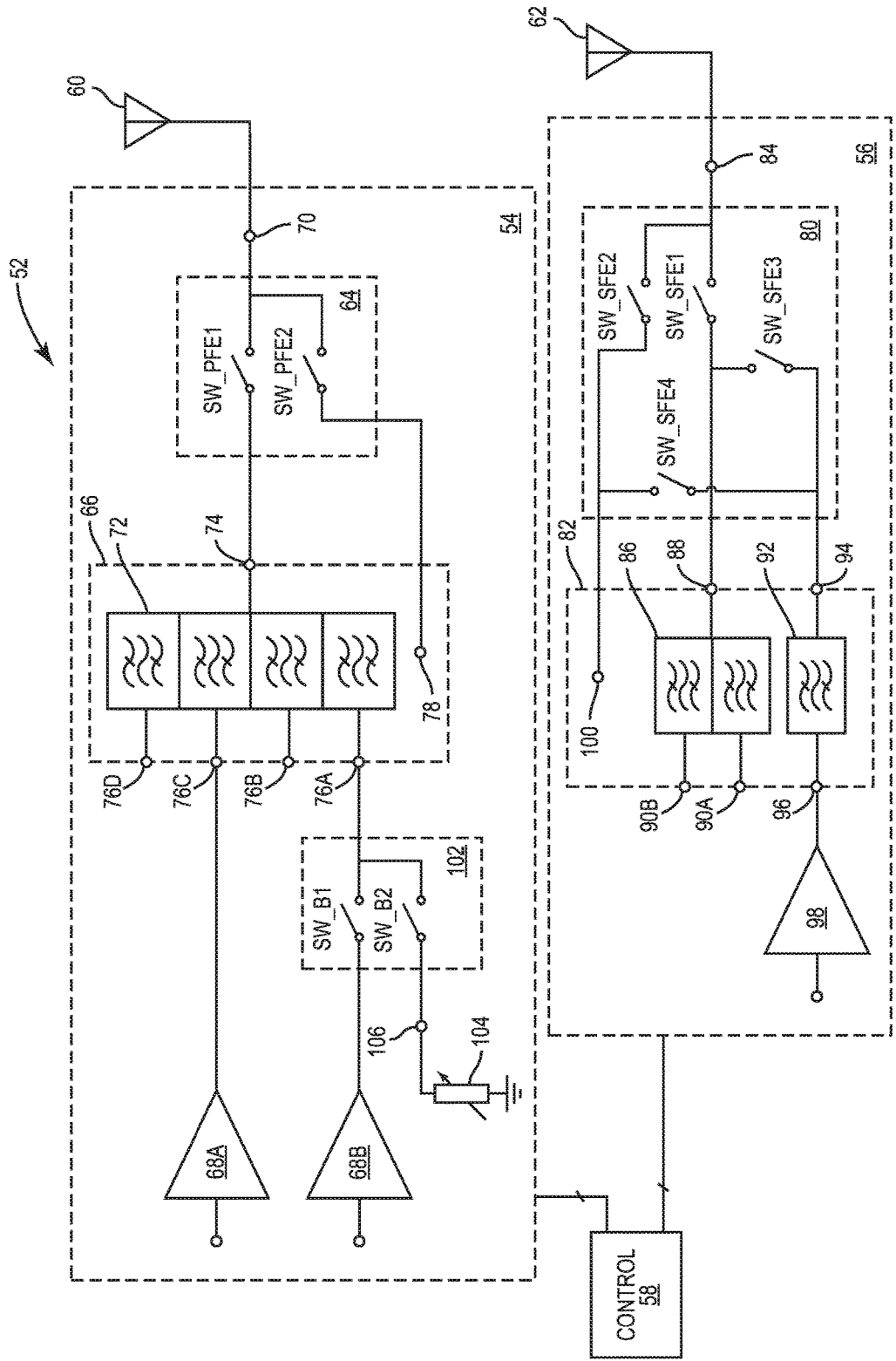
FIG. 3 is a functional schematic of RF front end circuitry according to one embodiment of the present disclosure.

The RF front end circuitry 52 discussed above provides significant improvements to the performance thereof in certain problematic uplink carrier aggregation configurations, such as when the first operating band is Long Term Evolution (LTE) operating band 3 and the second operating band is LTE operating band 1, or when the first operating band is LTE operating band 25 and the second operating band is LTE operating band 4. This is due to the antenna-to-antenna isolation of the signals from one another when they are simultaneously transmitted. However, there is still some cross-contamination of transmit signals due to antenna-to-antenna coupling, which may result in residual intermodulation. FIG. 3 shows the RF front end circuitry 52 configured to further reduce intermodulation according to one embodiment of the present disclosure.

The RF front end circuitry 52 shown in FIG. 3 is substantially similar to that shown in FIG. 2, but further includes band switching circuitry 102 coupled between the second one of the primary RF power amplifiers 68B, the first one of the input/output nodes 76A, and a termination impedance 104. Specifically, a first band switch SW_B1 is coupled between the second one of the primary RF power amplifiers 68B and the first one of the input/output nodes 76A and a second band switch SW_B2 is coupled between the termination impedance 104 and the first one of the input/output nodes 76A. Specifically, the second band switch SW_B2 is coupled between a termination impedance node 106 and the first one of the input/output nodes 76A, and the termination impedance 104 is coupled between the termination impedance node 106 and ground. The control circuitry 58 is configured to control the band switches such that in one or more uplink carrier aggregation configurations, the first band switch SW_B1 is opened and the second band switch SW_B2 is closed to couple the termination impedance 104 between the first one of the input/output nodes 76A and ground.

As discussed above, in such an embodiment RF signals within the transmit portion of the second operating band are transmitted from the primary communications circuitry 54, while RF signals within the transmit portion of the first operating band are transmitted from the secondary communications circuitry 56. Accordingly, the RF signals within the transmit portion of the first operating band may be coupled from the secondary antenna 62 to the primary antenna 60 and into the signal path of the primary communications circuitry 54. While the amount of coupling will be significantly reduced compared to conventional approaches, intermodulation may still occur between the RF signals within the transmit portion of the second operating band and the coupled RF signals within the transmit portion of the first operating band. By coupling the termination impedance 104 to the first one of the input/output nodes 76A, a desired impedance can be provided for the RF signals within the transmit portion of the first operating band in order to reduce intermodulation.

As discussed above, the primary filter 72 is configured to pass RF signals within the transmit portion of the first operating band between the common node 74 and the first one of the input/output nodes 76A while attenuating signals outside of the transmit portion of the first operating band. This means that the termination impedance 104 can be adjusted such that it is presented only to those RF signals within the transmit portion of the first operating band that may be undesirably coupled into the signal path of the primary communications circuitry as discussed above. A nominal impedance (e.g., ~50Ω) will be presented at all other frequencies. The termination impedance 104 may be adjusted in any desired way. In one embodiment, the termination impedance 104 is adjusted to provide a highly reflective impedance for RF signals within the transmit portion of the first operating band at the primary antenna 60 (a nominal impedance is provided at other frequencies). This may mean providing an impedance that will be highly reflective for RF signals within the transmit portion of the first operating band after a phase shift through the primary filter 72 (and any other intervening components) is applied. In one embodiment, the termination impedance 104 is provided to make the primary antenna node 70 appear as an open circuit at RF signals within the transmit portion of the first operating band. Providing the termination impedance 104 in this manner may reduce current flow of such RF signals in the signal path of the primary communications circuitry 54 due to reduced antenna-to-antenna coupling of the RF signals within the transmit portion of the first operating band from the secondary antenna 62 to the primary antenna 60, which may in turn result in reduced intermodulation through one of more closed switching elements in the signal path thereof. In another embodiment, the termination impedance 104 is provided to make the primary antenna node 70 appear as a closed circuit at RF signals within the transmit portion of the first operating band. Providing the termination impedance 104 in this manner may reduce the voltage of such RF signals across one or more open switches in the signal path of the primary communications circuitry 54 and thus the intermodulation experienced by these components.

As discussed herein, a highly reflective impedance may be an impedance with a return loss less than about 6 dB. Those skilled in the art will appreciate that the termination impedance 104 may be adjusted in any desired manner to provide reduced intermodulation in different situations, and further will appreciate that the termination impedance 104 may comprise any desired type of impedance (e.g., inductive, capacitive, etc.). In various embodiments, the termination impedance 104 may be statically or dynamically adjusted to achieve a desired reduction in intermodulation.

Since the primary filter 72 is already configured to pass RF signals within the transmit portion of the first operating band so that these signals may be transmitted by the primary communications circuitry 54 in non-carrier aggregation configurations as discussed above, the manipulation of the impedance of these signals during uplink carrier aggregation configurations is provided with the addition of a switch and the termination impedance, thereby consuming minimal additional real estate in the RF front end circuitry 52.

During non-uplink carrier aggregation configurations, the control circuitry 58 may cause the first band switch SW_B1 to be closed while the second band switch SW_B2 is opened, thereby connecting the output of the second one of the primary RF power amplifiers 68B to the first one of the input/output nodes 76A and disconnecting the termination impedance 104 from the first one of the input/output nodes 76A. Accordingly, RF signals within the transmit portion of the first operating band may be transmitted from the primary communications circuitry 54 as discussed above.

Figure 4:
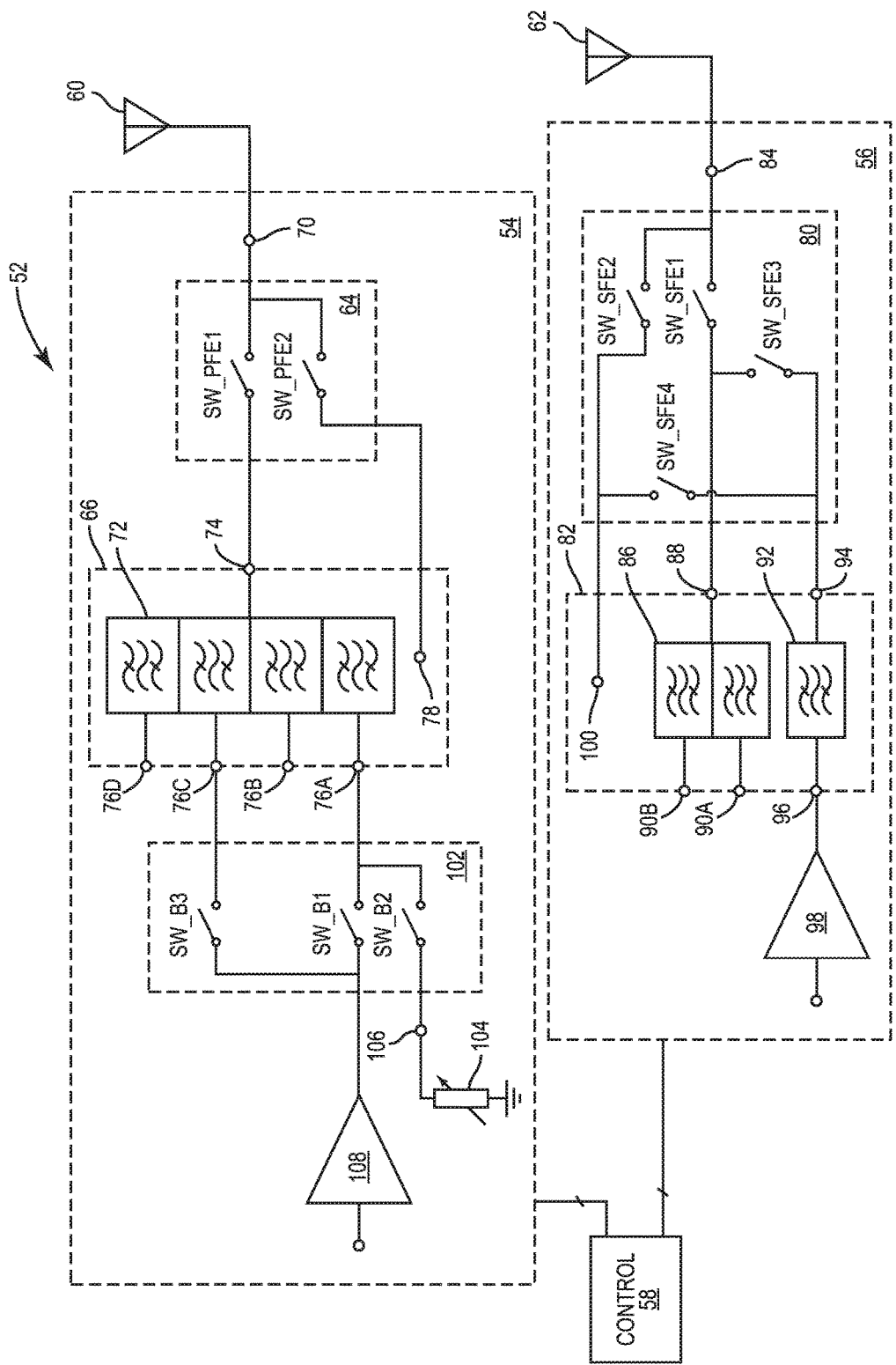
FIG. 4 is a functional schematic of RF front end circuitry according to one embodiment of the present disclosure.

FIG. 4 shows the RF front end circuitry 52 according to an additional embodiment of the present disclosure. The RF front end circuitry 52 shown in FIG. 4 is substantially similar to that shown in FIG. 3, except that the first one of the primary RF power amplifiers 68A and the second one of the primary RF power amplifiers 68B are provided by a multi-band primary RF power amplifier 108 configured to receive and amplify RF signals within the transmit portion of the first operating band and RF signals within the transmit portion of the second operating band. The first band switch SW_B1 is coupled between an output of the multi-band primary RF power amplifier 108 and the first one of the input/output nodes 76A, the second band switch SW_B2 is coupled between the first one of the input/output nodes 76A and the termination impedance 104, and a third band switch SW_B3 is coupled between the output of the multi-band primary RF power amplifier 108 and the third one of the input/output nodes 76C. The control circuitry 58 may operate the RF front end circuitry 52 as described above in one or more uplink carrier aggregation configurations. In non-uplink carrier aggregation configurations, the control circuitry 58 may cause the first band switch SW_B1 to close in order to transmit signals within the transmit portion of the first operating band and close the second band switch SW_B2 in order to transmit signals within the transmit portion of the second operating band. Using a multi-band RF power amplifier in the RF front end circuitry 52 may allow for a reduction in the footprint thereof, which may be desirable in certain circumstances.

Those skilled in the art will recognize improvements and modifications to the preferred embodiments of the present disclosure. All such improvements and modifications are considered within the scope of the concepts disclosed herein and the claims that follow.

What is claimed is:

1. Radio frequency (RF) circuitry comprising:
a filter coupled between a first input/output node and a common node and configured to:
pass RF signals within a transmit portion of a first operating band from the first input/output node to the common node while attenuating signals outside of the transmit portion of the first operating band between the first input/output node and the common node; and
pass RF signals within a transmit portion of a second operating band from a third input/output node to the common node while attenuating signals outside of the transmit portion of the second operating band between the third input/output node and the common node;
a termination impedance coupled between a termination impedance node and ground; and
band switching circuitry coupled to the first input/output node and configured to:
in a first mode of operation, provide RF transmit signals within the transmit portion of the second operating band to the third input/output node;
in the first mode of operation, couple the third input/output node to an output of an RF power amplifier to provide the RF transmit signals within the transmit portion of the second operating band to the third input/output node;
in a second mode of operation, provide RF transmit signals within the transmit portion of the first operating band to the first input/output node; and
in the second mode of operation, couple the first input/output node to the output of the RF power amplifier to provide the RF transmit signals within the first operating band to the first input/output node.

2. The RF circuitry of claim 1 wherein the filter is further configured to pass RF signals within a receive portion of the first operating band from the common node to a second input/output node while attenuating signals outside of the receive portion of the first operating band between the common node and the second input/output node.

3. The RF circuitry of claim 2 wherein the filter is further configured to
pass RF signals within a receive portion of the second operating band from the common node to a fourth input/output node while attenuating signals outside of the receive portion of the second operating band between the common node and the fourth input/output node.

4. The RF circuitry of claim 3 wherein the first operating band is Long Term Evolution (LTE) operating band 3 and the second operating band is LTE operating band 1.

5. The RF circuitry of claim 3 further comprising a first RF power amplifier and a second RF power amplifier, wherein:
in the first mode of operation, the band switching circuitry is configured to couple the third input/output node to an output of the second RF power amplifier to provide the RF transmit signals within the transmit portion of the second operating band to the third input/output node; and
in the second mode of operation, the band switching circuitry is configured to couple the first input/output node to an output of the first RF power amplifier to provide the RF transmit signals within the transmit portion of the first operating band to the first input/output node.

6. The RF circuitry of claim 3 wherein an impedance of the termination impedance is adjustable.

7. The RF circuitry of claim 6 wherein in the first mode of operation, the termination impedance is adjusted such that a low impedance path from the common node to ground is provided for RF signals within the transmit portion of the first operating band and a nominal impedance is presented at the common node for signals outside of the transmit portion of the first operating band.

8. The RF circuitry of claim 7 further comprising a first antenna coupled to the common node, wherein:
in the first mode of operation, a portion of the RF transmit signals within the transmit portion of the first operating band transmitted from a second antenna and coupled to the common node by the first antenna is shunted to ground via the low impedance path from the common node to ground such that a voltage of the portion of the RF transmit signals within the transmit portion of the first operating band is reduced; and
in the second mode of operation, the RF transmit signals within the transmit portion of the first operating band are transmitted from the first antenna.

9. The RF circuitry of claim 6 wherein in the first mode of operation, the termination impedance is adjusted such that a high impedance is presented at the common node for RF signals within the transmit portion of the first operating band and a nominal impedance is presented at the common node for signals outside of the transmit portion of the first operating band.

10. The RF circuitry of claim 9 further comprising a first antenna coupled to the common node, wherein:
in the first mode of operation, the high impedance is presented to a portion of the RF transmit signals within the transmit portion of the first operating band transmitted from a second antenna and coupled to the common node by the first antenna such that a current of the portion of the RF transmit signals within the transmit portion of the first operating band is reduced; and
in the second mode of operation, the RF transmit signals within the transmit portion of the first operating band are transmitted from the first antenna.

11. The RF circuitry of claim 1 wherein an impedance of the termination impedance is adjustable.

12. The RF circuitry of claim 11 wherein in the first mode of operation, the termination impedance is adjusted such that a low impedance path from the common node to ground is provided for RF signals within the transmit portion of the first operating band and a nominal impedance is presented at the common node for signals outside of the transmit portion of the first operating band.

13. The RF circuitry of claim 11 wherein in the first mode of operation, the termination impedance is adjusted such that a high impedance is presented at the common node for RF signals within the transmit portion of the first operating band and a nominal impedance is presented at the common node for signals outside of the transmit portion of the first operating band.

14. The RF circuitry of claim 1 further comprising a first antenna coupled to the common node, wherein:

in the first mode of operation, a portion of the RF transmit signals within the transmit portion of the first operating band transmitted from a second antenna are coupled to the common node by the first antenna; and in the second mode of operation, the RF transmit signals within the transmit portion of the first operating band are transmitted from the first antenna.

15. The RF circuitry of claim 1 wherein the termination impedance is configured to present a phase shift to the termination impedance node.

16. The RF circuitry of claim 1 further comprising control circuitry coupled to the band switching circuitry and configured to:

cause the band switching circuitry to couple the termination impedance node to the first input/output node in the first mode of operation; and cause the band switching circuitry to provide the RF transmit signals within the transmit portion of the first operating band in the second mode of operation.

17. The RF circuitry of claim 1 wherein the filter is a multiplexer.

18. The RF circuitry of claim 1 wherein in the first mode of operation, the band switching circuitry is further configured to couple the termination impedance node to the first input/output node such that the termination impedance is coupled between the first input/output node and ground.

* * * * *